United States Patent

Damkjær

[11] Patent Number: 5,379,883
[45] Date of Patent: Jan. 10, 1995

[54] CHAIN LINK CONVEYOR

[75] Inventor: Poul E. Damkjær, Vejle Øst, Denmark

[73] Assignee: Maskinfabrikken Baeltix A/S, Vejle Øst, Denmark

[21] Appl. No.: 183,769

[22] Filed: Jan. 21, 1994

[30] Foreign Application Priority Data

Jan. 21, 1993 [DK] Denmark .................. 0073/93
Nov. 26, 1993 [DK] Denmark .................. 1329/93

[51] Int. Cl.⁶ .................................. B65G 17/06
[52] U.S. Cl. .................................. 198/853
[58] Field of Search .................. 198/850, 851, 853

[56] References Cited

U.S. PATENT DOCUMENTS

| | | | |
|---|---|---|---|
| 4,880,107 | 11/1989 | Deal | 198/853 X |
| 4,893,710 | 1/1990 | Bailey et al. | 198/853 |
| 4,934,518 | 6/1990 | Lapeyre | 198/853 |
| 4,993,544 | 2/1991 | Bailey et al. | 198/853 X |
| 5,083,659 | 1/1992 | Bode et al. | 198/853 |
| 5,096,053 | 3/1992 | Hodlewski | 198/853 |
| 5,215,185 | 6/1993 | Counter et al. | 198/853 |
| 5,217,110 | 6/1993 | Spangler et al. | 198/853 X |

FOREIGN PATENT DOCUMENTS 1367463 9/1974 United Kingdom ............ 198/853

*Primary Examiner*—James R. Bidwell
*Attorney, Agent, or Firm*—Antonelli, Terry, Stout & Kraus

[57] ABSTRACT

A chain link conveyor comprising a plurality of identical plastic chain links having eye-shaped hinge parts on opposite side edges, with the eye-shaped hinge parts being arranged so as to enable the neighboring chain links to be coupled by a pin or axle. The eye-shaped hinge parts on the opposite sides of each chain link are mutually displaced and the opposite hinge parts in each chain link are integral with each other by ribs or connecting parts. Transverse parts are integral with the ribs or connecting parts, with at least some of the transverse parts being arranged so as to engage the driving wheels of the chain link conveyor. Each chain link is configured as a fine-meshed grate structure including surface or surface like parts substantially perpendicular to the top and bottom surface of the chain link. An edge constituting the top and bottom surface of the surfaces or surface-like parts have a decreasing thickness and end in edges having a slight thickness.

7 Claims, 3 Drawing Sheets

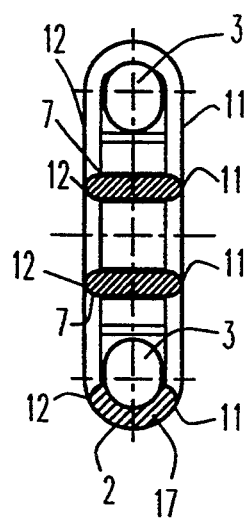
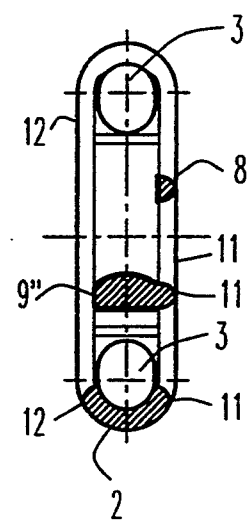
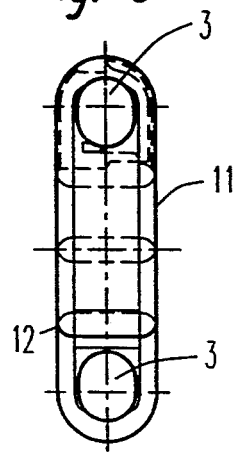

CHAIN LINK CONVEYOR

BACKGROUND OF THE INVENTION

The invention relates to a chain link conveyor comprising a number of identical chain links of plastic with eye-shaped hinge parts in the edge of opposite sides and arranged to be coupled together with corresponding hinge parts in neighboring chain links by means of a common pin or axle through the openings in the hinge parts, with the hinge parts on the opposite sides of each chain link being mutually displaced, opposite hinge parts in each chain link being coupled together by ribs or connecting parts, and with transverse parts arranged to engage with a driving wheel, which transverse parts are integral with the ribs or connecting parts.

Chain links of this type for chain link conveyors are usually made of plastic by injection moulding in a suitable plastic material depending on use etc., as each link is moulded as an integral unit, which by axles or pins, either steel or plastic axles, are assembled to an endless conveyor chain to be pulled by one or more chain wheels and led over one or more idle wheels. Such modular chain links may also be assembled width-wise to form wide conveyor belts.

Chain links of this type are for example, proposed in U.S. Pat. No. 4,832,187, wherein a transverse row of central openings is arranged to engage with chain wheels for conveyance in any direction. In addition to this, the chain link comprises a number of eye-shaped hinge parts for engagement with neighbouring chain links. All the parts have a narrow but plane, upwardly facing edge, which edges together constitute a top surface arranged to carry the material to be conveyed.

U.S. Pat. No. 4,051,949 proposes another type of chain link for a chain link conveyor or a conveyor belt, viz. a chain link with upwardly extending ribs, the plane top edges of which constitute the top surface which is arranged to carry the material to be conveyed.

Chain links of the above-mentioned types are often used in chain link conveyors or chain link belts for cans, for example aluminium cans for beverages such as beer, coke etc., or for the reusable large bottles of plastic, which are very popular at present, which bottles are used for coke and other soft drinks in particular. As an example, the chain link belts can be used in the supply of empty containers to a filling machine and in the further transport to a packing and casing department etc. In this connection various problems have often been observed. Aluminium cans leave a thin layer of aluminium oxide on the top surface of the conveyor resulting in a great and constant need for cleaning, a cleaning which is a demanding task, because aluminium oxide sticks extremely firmly to many of the types of plastic which for other reasons are used for the production of chain links.

The openings in the top surface present another problem. These openings cause the reusable large bottles of plastic to stand in an unstable manner, because their bottom is configured with five support points. These bottles are often referred to as petaloid bottles.

The friction between the items, be it aluminium cans or petaloid bottles, and the surface of the chain link belt presents a third problem when the empty items are being stowed, for example, in front of the filling machine. If the friction is too high, which is possible with the conveyor belts of the known types, the items at the front may be deformed, which is not acceptable. Aluminium smudging can cause varying friction and unstable conveyance.

The company often demands that the belts be operated without lubrication, so-called dry conveyance, which also increases the friction between the conveyor belt and the items placed on it. A too high friction can also be due to poor cleaning or sticky material which has been spilt on the belt, for example coke, beer etc.

Finally, it is a purely practical experience that chain links with freely upward extending ribs have a tendency to cause pulsations in the belt and as a consequence, uneven conveyance, which is not desirable.

SUMMARY OF THE INVENTION

The drawbacks of the known chain links are avoided by configuring each chain link in a chain link conveyor as a comparatively fine-meshed grate structure, preferably of surfaces or surface-like parts substantially perpendicularly to the top or bottom surface of the chain link, and by the parts on the edge constituting the actual top surface all having strongly decreasing thickness and ending in edges having a reduced surface.

Tests have shown that by conveyance with aluminium cans on chain link conveyors aluminium smudging takes place, so that aluminium oxide is deposited on the top surface of the conveyor. With the chain link conveyor according to the invention the smudging is less than with the known conveyors and the smudging can be removed. The aluminium smudging on the chain link conveyor according the invention is often removed by friction with the items on the belt so that a self-cleaning effect is obtained. Chains of this type are particularly well-suited for dry conveyance and have the desired reduced frictional qualities, so that deformation of the frontmost and heaviest loaded items is avoided during stowing. It has moreover been established that a comparatively fine-meshed grate structure in addition to the fact that the surface is actually constituted solely by edges of a slight thickness, approximately like a knife edge, provide an optimum combination of surface friction and surface perforation, so that even petaloid containers will stand in a stable manner without risking that one or more of their support points "fall into" the openings in the surface.

Thus, the chain link according to the invention is particularly characteristic in that the top surface is constituted by a grating with minimum contact with the items to be conveyed, but in such a manner that only relatively small openings appear in the top surface.

Additionally, by configuring the bottom surface of the chain link with tapered or knife edge-shaped edges, the friction against the support track is moreover reduced, so that the power consumption is minimized and a completely even conveyance is obtained, also by dry conveyance.

Because the transverse parts of the chain links comprise areas arranged for one-sided engagement with driving wheels it is achieved that the chain link conveyor is pulled in well-defined places depending on whether it is to go in one direction or in the opposite direction, so that weakening of the chain link parts can be avoided by arranging these for driving engagement from both directions.

Hereby the possibility is moreover provided of configuring an optimum reinforcement of the parts in each chain link, which can enter into engagement with a driving chain link, which increases the strength and the wearability.

By configuring the chain links with an integral locking dowel in at least one of the eye-shaped hinge parts it is achieved that the individual chain links are always ready for use and that one can benefit by all the advantages of the use of an integral locking dowel which are described in the Danish patent Application No. 1257/93 (not published yet) of Nov. 5, 1993.

If the openings in the eye-shaped parts of the chain links for the axle pins are configured in a slightly oval manner, a chain link and thus a chain link conveyor is obtained, which can be cleaned completely, so that it can be accepted for the direct transport of food articles. The slightly oval hole provides the possibility of complete cleaning.

By configuring the chain links in such a manner that all eye-shaped hinge parts comprise two preferably parallel arms in the direction of travel and by coupling them together on the side of the opening facing away from the middle of each chain link, stronger and more wear-resisting chain links are obtained as well as a chain link construction, where none of the parts can vibrate, and thus a safe and steady conveyance is provided at all times with a conveyor built of chain links according to the invention. At the same time a more fine-meshed grate structure is obtained.

By configuring the chain links in such a manner that the distance between the top surface and the bottom surface is in the order of twice the diameter of the openings in the hinge eyes, the possibility is at once provided of obtaining a low building height and great tensile strength without reducing the possibilities of cleaning and keeping the chain links clean in an easy manner. A low building height is moreover of great importance to a steady conveyance of the belt, so that pulsations are completely avoided.

By configuring the chain links according to the invention with engagement areas for the driving wheels it is ensured that there is always space for the teeth of the driving wheels for correct engagement on the underside of the chain link. At the same time suitable areas appear, where the chain links can be marked with a number or other identification, so that each chain link is clearly and visibly identifiable without these parts forming part of the supporting top surface of the chain link and thus possibly causing drawbacks by breaking the uniformity of the top surface.

BRIEF DESCRIPTION OF THE DRAWINGS

Two examples of chain links according to the invention will hereafter be explained in more detail with reference to the accompanying drawings, wherein:

FIG. 3 is a sectional view taken along the line III—III in FIG. 1;

FIG. 4 is a sectional view taken along the line IV—IV in FIG. 1;

FIG. 5 is a side view of the chain link of FIG. 1 taken in a direction of the arrows V—V;

DETAILED DESCRIPTION

Figure 1:
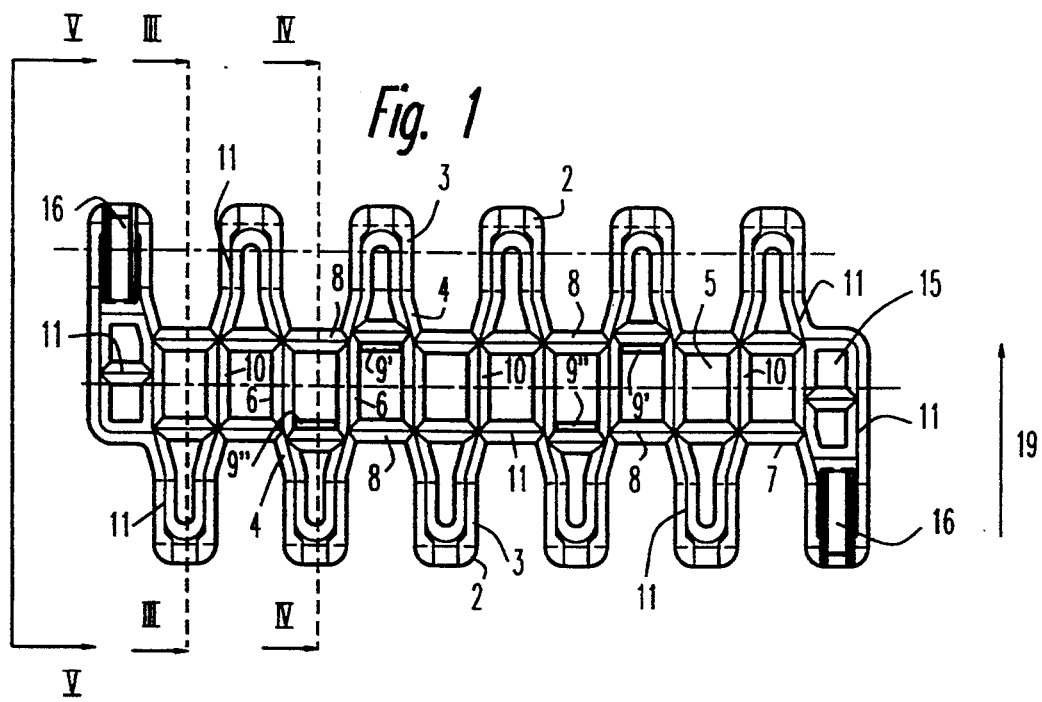
FIG. 1 is a top plan view of a chain link according to the first embodiment of the invention.

In the first embodiment of the invention the chain link 1, as shown in FIGS. 1-5, comprises a chain link, which on opposite sides has a number of hinge eyes 2 with transverse, through-going holes 3 placed along a line and arranged for an axle or pin to be inserted for the coupling together of neighboring chain links, the hinge eyes of which are positioned in the spaces between the hinge eyes of the shown chain link.

To limit the sideways movement of an axle, the outermost hinge eye 2 on each side of each chain link is provided with an integral locker dowel or pin 16, which blocks the way for the axle and is shown and explained in detail in the aforementioned Danish patent Application No. 1257/93.

Each hinge eye 2 is built of two outwardly extending, preferably flat parts 18 (FIG. 2) meeting in the area 17 at the outwardly facing end of each hinge eye 2, which provides a stable and wear-resisting construction with maximum thickness of material in the place of the opening or the hole 3, which by normal use is exposed to wear.

The chain link 1 is built as an integral grate structure, which, in addition to the hinge eyes 2, comprises inclined connecting parts 4 and a transverse structure 5 composed of a number of quadrangles among other things comprising the engagement spots for driving and idle wheels, and which moreover is integral with endings 15 on each side of each link.

The transverse structure 5 comprises connecting parts 6 in full height in the direction of tension and other connecting parts 10, likewise in the direction of tension, but in reduced height measured from the underside.

Figure 2:
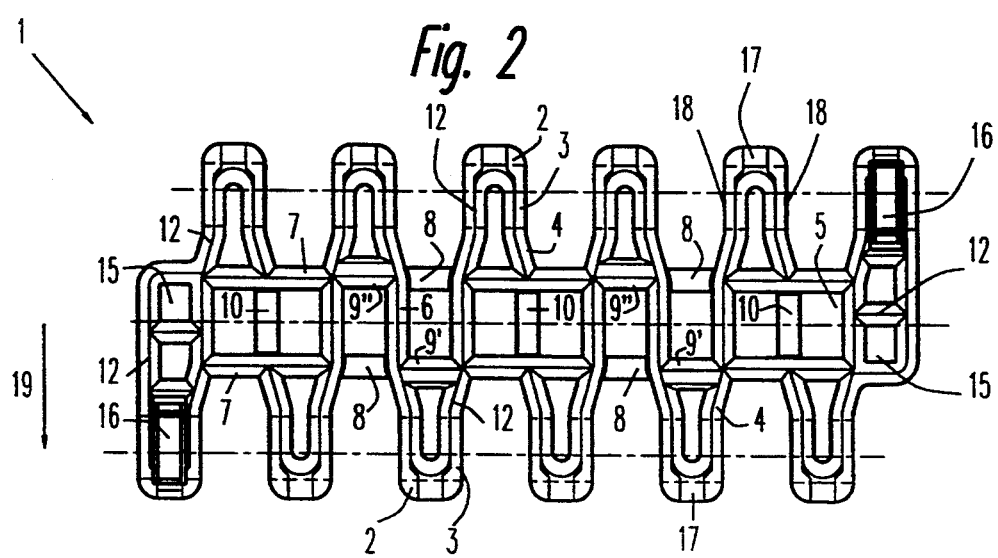
FIG. 2 is a bottom plan view of the chain link of FIG. 1.
Figure 6:
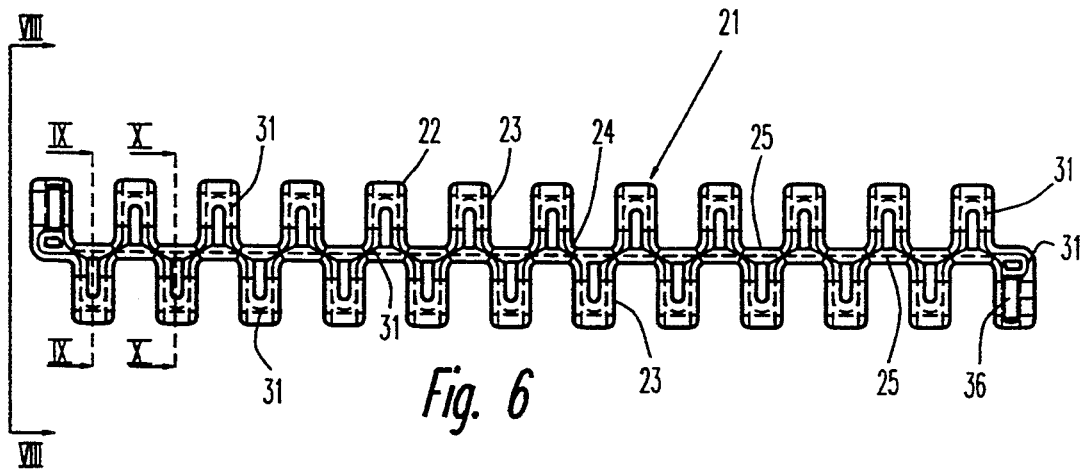
FIG. 6 is a top plan view of a chain link according to the second embodiment of the invention.

The transverse structure 5 additionally comprises connecting parts 7 in full height in the transverse direction and other connecting parts 9' and 9", likewise in the transverse direction, but with an increased thickness, (FIG. 4) as these transverse parts are arranged for direct engagement with driving wheels depending on the direction of conveyance. Other transverse parts 8, positioned immediately opposite the connecting parts 9', 9" have strongly reduced height, (FIG. 4) as well, to allow space for the driving wheels and are moreover usually plane on the side facing the underside for the marking with type number, model number or other identification, which applies to the underside of the connecting parts 10 as well, (FIG. 2).

Thus, for conveyance in the direction of the arrow 19 with chains and belts built of chain links according to the invention (FIG. 2) the connecting parts 9' are used for engagement with chain wheels (not shown), and for conveyance in the opposite direction the connecting parts 9" are used.

The supporting surface of each chain link 1, which is usually called the top surface, is solely built of the many edges of the grate structure, as all connecting parts and hinge eyes are ended by the surface-like parts being substantially perpendicular to the top surface of the chain link having greatly decreasing thickness towards the top surface and ending in edges 11 with a slight thickness or very sharp edges, approximately like a knife edge. Towards the bottom surface the grate structure of the chain link is ended in the same manner by the edges 12. Thus, the whole top surface is built of a grate structure with quite sharp edges 11 being evenly distributed over the whole surface, and the bottom surface is likewise built of a grate structure with quite sharp edges 12, which, however, are not necessarily evenly distributed over the chain link, namely in those places where the connecting parts 8, 10 have reduced height.

In the embodiment shown in FIGS. 6–10 is shown a chain link 21, in which the previously mentioned transverse structure 5 built of quadrangles is replaced by a single transverse, through-going part 25. Additionally, the chain link has a number of hinge eyes 22 with axle bores 23 and inclined connecting parts 24 as previously mentioned in connection with FIGS. 1–5.

In a corresponding manner and as explained in connection with FIGS. 1–5 the hinge eyes 2 are two-piece units being connected in the area 27 on the outwardly facing part of each hinge eye.

Figure 7:
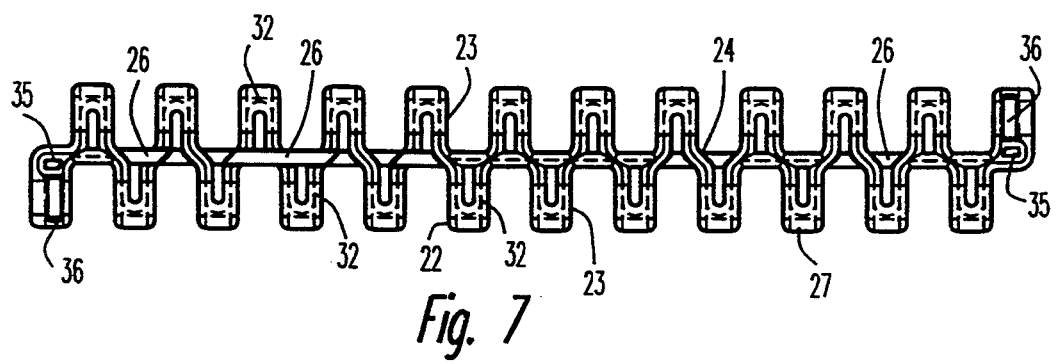
FIG. 7 is a bottom plan view of the chain link of FIG. 6.
Figure 8:
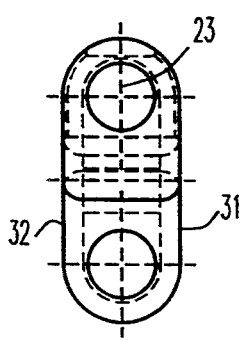
FIG. 8 is a cross-sectional view, on an enlarged scale, of the chain link in FIG. 6 taken along the line VIII—VIII in FIG. 6.
Figure 9:
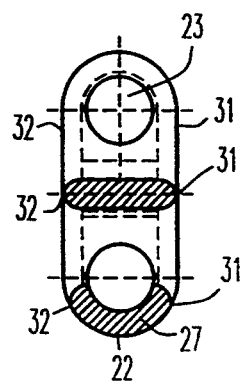
FIG. 9 is a plan view, on an enlarged scale, taken in the direction X—X in FIG. 6.
Figure 10:
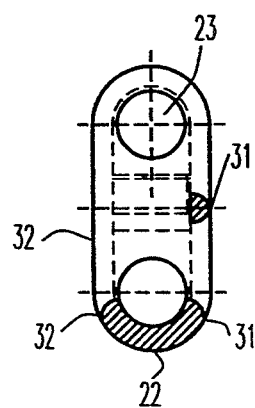
FIG. 10 is a cross-sectional view, on an enlarged scale, taken along the line X—X in FIG. 6.

On the underside the transverse part 25 moreover comprises areas 26 with surfaces providing the possibility of marking etc., see FIG. 7.

In this configuration the top surface of each chain link is likewise built of sharp, tapered edges 31 only, and the bottom surface solely comprises sharp, tapered edges 32.

On each side each chain link has a side ending 35, likewise with sharp edges as top and bottom surfaces, from which the outermost hinge eye extends on each side comprising an integral locking dowel 36 corresponding to the previously mentioned locking dowel 16 in FIG. 1.

I claim:

1. Chain link conveyor comprising a plurality of identical plastic chain links with eye-shaped hinge parts disposed along opposite side edges, said chain links being adapted to be coupled together with corresponding hinge parts in neighboring chain links by a pin or axle inserted through transverse openings provided in the eye-shaped hinge parts, said eye-shaped hinge parts on the opposite side edges of each chain link are mutually displaced with respect to each other, said hinge parts on the opposite side edges of each chain link being connected with each other by first connecting parts extending in a conveying direction of the respective chain link and second connecting parts extending transversely to said first connecting parts, said first and second connecting parts being arranged so as to define a top and bottom surface of the respective conveyor links fashioned as a fine-meshed grate structure, said first and second connecting parts being molded in one piece with said eye-shaped hinge parts and extending substantially perpendicular to the top and bottom surfaces of the respective chain links, the respective first and second connecting parts have a decreasing thickness terminating in an edge constituting the top surface and bottom surface, and wherein the respective edges of the first and second connecting parts are substantially knife-edged.

2. Chain link conveyor according to claim 1, wherein the second connecting parts are each fashioned as a transverse rib, with at least some of the transverse ribs including areas arranged for one-sided engagement with driving wheels, of the chain link conveyors, and wherein said areas are reinforced.

3. Chain link conveyor according to claim 1, wherein at least one of the eye-shaped hinge parts comprises a locking dowel for limiting sideways movement of the pin or axle, and wherein the locking dowel is integral with the respective chain links.

4. Chain link conveyor according to claim 1, wherein the transverse openings are substantially oval, with a major axis of the oval opening being disposed on the same plane as the conveying direction.

5. Chain link conveyor according to claim 1, wherein all eye-shaped hinge parts comprise two parallel surface portions extending in the conveying direction, and wherein said surface portions are coupled together on a side of the respective transverse openings k facing away from a center of the respective chain links.

6. Chain link conveyor according to claim 1, wherein a distance between the top surface and the bottom surface is about twice a diameter of the respective transverse openings in the hinge eye parts.

7. Chain link conveyor according to claim 1, wherein the areas for one-sided engagement for the driving wheels in the respective chain links comprises areas on an underside of the respective chain links configured with a reduced height and with a substantially planar surface.

* * * * *